(12) United States Patent
Friedman

(10) Patent No.: US 8,710,449 B2
(45) Date of Patent: Apr. 29, 2014

(54) PLASMA PANEL BASED RADIATION DETECTOR

(71) Applicant: Integrated Sensors, LLC, Toledo, OH (US)

(72) Inventor: Peter S. Friedman, Toledo, OH (US)

(73) Assignee: Integrated Sensors, LLC, Toledo, OH (US)

(*) Notice: Subject to any disclaimer, the term of this patent is extended or adjusted under 35 U.S.C. 154(b) by 0 days.

(21) Appl. No.: 13/848,975

(22) Filed: Mar. 22, 2013

(65) Prior Publication Data

US 2013/0284884 A1   Oct. 31, 2013

Related U.S. Application Data

(63) Continuation of application No. 13/445,545, filed on Apr. 12, 2012, now abandoned, which is a continuation of application No. 13/038,969, filed on Mar. 2, 2011, now Pat. No. 8,158,953, which is a continuation of application No. 12/706,871, filed on Feb. 17, 2010, now Pat. No. 7,902,516, which is a continuation of application No. 11/926,547, filed on Oct. 29, 2007, now Pat. No. 7,683,340.

(60) Provisional application No. 60/854,919, filed on Oct. 28, 2006, provisional application No. 60/878,508, filed on Jan. 4, 2007.

(51) Int. Cl.
   *H01J 47/00*   (2006.01)

(52) U.S. Cl.
   USPC ..................................... 250/385.1

(58) Field of Classification Search
   USPC ..................................... 250/385.1
   See application file for complete search history.

(56) References Cited

U.S. PATENT DOCUMENTS

| | | | |
|---|---|---|---|
| 2,876,360 A | 3/1959 | Victoreen | |
| 3,614,437 A * | 10/1971 | Allemand et al. | ............ 376/153 |
| 3,772,521 A | 11/1973 | Perez-Mendez | |
| 3,786,270 A | 1/1974 | Borkowski et al. | |

(Continued)

FOREIGN PATENT DOCUMENTS

EP        1274115 A2     1/2003

OTHER PUBLICATIONS

Anderson et al.; "A Low-Pressure, Micro-Strip as Chamber Operated With Secondary-Electron Emission"; Nucl.Instr. and Meth.; A346 (1994); 102106.

(Continued)

*Primary Examiner* — Kiho Kim
(74) *Attorney, Agent, or Firm* — Miles & Stockbridge P.C.

(57) ABSTRACT

A position-sensitive radiation counting detector includes a first and a second substrate. A gas is contained within the gap between the substrates. A photocathode layer is coupled to the first substrate and faces the second substrate. A first electrode is coupled to the second substrate and a second electrode is electrically coupled to the first electrode. A first impedance is coupled to the first electrode and a power supply is coupled to at least one electrode. A first discharge event detector is coupled to one of the electrodes for detecting a gas discharge event in the electrode. The radiation counting detector further includes a plurality of pixels, each capable of outputting a gas discharge counting event pulse upon interaction with radiation received from the photocathode. Each gas discharge pulse is counted as having an approximately equal value.

22 Claims, 11 Drawing Sheets

(56) References Cited

U.S. PATENT DOCUMENTS

| | | | |
|---|---|---|---|
| 4,365,159 | A | 12/1982 | Young |
| 4,392,057 | A | 7/1983 | Mathieson et al. |
| 4,591,717 | A | 5/1986 | Scherber |
| 4,816,683 | A | 3/1989 | Marsden |
| 4,937,455 | A | 6/1990 | Kurz |
| 4,999,501 | A | 3/1991 | Lacy |
| 5,223,717 | A | 6/1993 | Charpak |
| 5,688,698 | A | 11/1997 | Robinson et al. |
| 5,773,829 | A | 6/1998 | Iwanczyk et al. |
| 6,011,265 | A | 1/2000 | Sauli |
| 6,097,032 | A | 8/2000 | Tanimori et al. |
| 6,584,419 | B1 | 6/2003 | Alexander |
| 6,703,619 | B2 * | 3/2004 | Takahashi ............ 250/385.1 |
| 6,765,213 | B2 | 7/2004 | Shahar et al. |
| 7,157,718 | B2 | 1/2007 | Gianchandani et al. |
| 7,170,066 | B2 | 1/2007 | Virtanen |
| 7,332,726 | B2 | 2/2008 | Friedman et al. |
| 2002/0036269 | A1 * | 3/2002 | Shahar et al. ............ 250/370.1 |
| 2002/0139935 | A1 | 10/2002 | Klein et al. |
| 2005/0242291 | A1 * | 11/2005 | Gianchandani et al. ...... 250/374 |
| 2006/0049362 | A1 | 3/2006 | Friedman et al. |

OTHER PUBLICATIONS

Contract No. DTRA01-03-C-0042; issued by the U.S. Dept. of Defense; Defense Threat Reduction Agency to Photonics Systems, Inc. on May 16, 2003 and completed on Oct. 31, 2004.

Lasche et al.; "Detection Sensitivity for Special Nuclear Materials With an Advanced High-Pressure Xenon Detector and Robust Fitting Anlysis"; IEEE Trans. Nucl. Sci.; 48 (2001); pp. 325-329.

Sauli; "GEM: A New Concept for Electron Amplification in Gas Detectors"; Nucl. Instr. and Meth.; A386 (1997); pp. 531-534.

Bouhali et al.; "The Micromegem Detector"; Nucl. Instr. and Meth.; A459 (2001); pp. 211-220.

Knoll; "Radiation Detection and Measurement"; 3rd ed.; John Wiley & Sons Inc. (2000); pp. 192-194 and 509 (book cover included.).

Clergeau et al.; "Operation of Sealed Microstrip Gas Chambers at the ILL"; IEEE Trans. Nucl. Sci.; 48 (2001); pp. 1075-1080.

Bateman et al.; "Studies of the Gain Properties of Microstrip Gas Counters Relevant to Their Application as X-Ray and Electron Detectors"; IEEE Trans. Nucl. Sci.; 49 (2002); pp. 1644-1650.

Ziock et al.; "A Large-Area PSPMT-Based Gamma-Ray Imager With Edge Reclamation"; IEEE Trans. Nucl. Sci.; 49 (2002); pp. 1552-1559.

Graeve et al.; "High-Resolution CMOS Imaging Detector"; Medical Imaging (2001); Physics of Medical Imaging; SPEI vol. 4320.

Mahler et al.; A Portable Gamma-Ray Spectrometer Using Compressed Xenon; IEEE Trans. Nucl. Sci.; NS-45 (1998); pp. 1029-1033.

Nagarkar et al.; "Structured LiI Scintillator for Thermal Neutron Imaging":, IEEE Trans. Nucl. Sci.; NS-48 (2001) pp. 2330-2334.

Kurfess et al.; "Coincident Compton Nuclear Medical Imager"; IEEE Nucl. Sci. Symposium; San Diego (2001); http://heseweb.nrl.navy.mil/gammakletector/papers/M4-5.pdf.

Fehlau; "Integrated Neutron/Gamma-Ray Portal Monitors for Nuclear Safeguards"; IEEE Trans. Nucl. Sci.; NS-41 (1994); pp. 922-926.

Breskin; "Advances in Gas Avalanche Radiation Detectors for Biomedical Applications"; Nucl. Instr. and Meth.; A454 (2000); pp. 26-39.

Angelini et al.; The Micro-Gap Chamber; Nucl. Instr. And Meth.; A335 (1993); pp. 69-77.

Beckers et al.; "Optimization of Microstrip Gas Chamber Design and Operating Conditions"; Nucl. Instr. and Meth.; A346 (1994); pp. 95-101.

Breskin et al.; "Ion-Induced Effects in GEM and GEM/MHSP Gaseous Photomultipliers for the UV and Visible Spectral Range"; Nucl. Instr. and Meth.; A553 (2005); pp. 46-52.

Eden et al.; "Recent Advances in Microcavity Plasma Devices and Arrays: A Versatile Photonic Platform"; J. Phys. D Appl. Phys. 38 (2005); pp. 1644-1648.

Friedman; "A New Class of Low Cost, High Performance, Radiation Detectors"; 2005 IEEE Nuclear Science Symposium & Medical Imaging Conf. (Puerto Rico); NSS Conf. Record, Paper J03-7; Dec. 2005; pp. 2815-2822.

Friedman; "Plasma Panel Sensors as Scintillation Detectors"; 2006 IEEE Nuclear Science Symposium & Medical Imaging Conf. (San Diego), NSS Conf. Record, Paper N30-136; Feb. 2007; pp. 1150-1159.

Ketzer et al.; "Triple GEM Tracking Detectors for COMPSS"; IEEE Trans. Nucl. Instr. and Meth.; A386; 1997; pp. 531-534.

Kurfess et al.; "Considerations for the Next Compton Telescope Mission; The 5th Compton Symposium;ed. M.L. McConnell and J.M. Ryan; AIP Conference Proceedings; 2000; p. 510.

Bonin et al.; "A Pixel Chamber to Monitor the Beam Performances in Hadron Therapy"; Nuclear Instruments & Methods in Physics Research; Oct. 13, 2003; Elsevier B.V.; pp. 674-686.

Amerio et al.. "Dosimetric Characterization of a Large Area Pixel-Segmented Ionizatin Chamber"; Med. Phus. 31 (2); Feb. 2004; Am. Assoc. Phus. Med.; pp. 414-420.

* cited by examiner

PLASMA PANEL BASED RADIATION DETECTOR

RELATED APPLICATIONS

This is a continuation application of U.S. patent application Ser. No. 13/445,545, filed on Apr. 12, 2012, which is a continuation application of U.S. patent application Ser. No. 13/038,969, filed on Mar. 2, 2011, issued as U.S. Pat. No. 8,158,953 on Apr. 17, 2012, which is a continuation application of U.S. application Ser. No. 12/706,871, filed on Feb. 17, 2010, issued as U.S. Pat. No. 7,902,516 on Mar. 8, 2011, which is a continuation application of U.S. patent application Ser. No. 11/926,547, filed on Oct. 29, 2007, issued as U.S. Pat. No. 7,683,340 on Mar. 23, 2010, which claims the benefit of U.S. Provisional Patent Application No. 60/854,919, filed Oct. 28, 2006, and U.S. Provisional Application No. 60/878,508, filed Jan. 4, 2007. The disclosure of each of the above-listed applications is herein incorporated by reference.

FIELD OF THE INVENTION

Embodiments of the present invention are directed to radiation detection. More particularly, one embodiment of the present invention is directed to a plasma panel based method and apparatus for radiation detection.

BACKGROUND INFORMATION

Many useful applications, such as the detection of radioactive material, computer-assisted tomography ("CAT"), digital radiology, optical detectors, etc., rely on the detection of ionizing radiation (e.g., X-ray and gamma-ray photons and/or high energy particles—both neutral and charged) as well as "non-ionizing" photons. Non-ionizing photons, sometimes referred to as "optical" photons, are photons generally falling within the energy range from the ultraviolet ("UV") to near-infrared ("IR"), and are commonly detected by various types of devices such as complementary metal-oxide-semiconductor ("CMOS"), charge-coupled devices ("CCDs"), avalanche photodiodes ("APD"s), photomultiplier tubes ("PMT"s), etc. Generally, the low energy end of the X-ray region begins at about 10 nm, which also approximately defines the high energy end of the "optical" photon region. However, different described energy regions broadly overlap and so descriptive terms such as "ionizing" and "non-ionizing" and "optical" in reference to a type of radiation are merely used to label a spectral region or particle energy but are not narrowly defined. For example, a given UV photon can be both ionizing and non-ionizing depending upon the interacting media. Even photons in the "visible" region can be ionizing with respect to certain materials.

Many prior art radiation detectors are proportional detectors. In general, proportional detectors store charge in capacitors or other means, and the total amount of stored charge is proportional to detected radiation. Proportional detectors operate on the principle of linear gas multiplication, and the final charge measured is proportional to the number of original ion pairs created within the gas by the incident radiation, which is proportional to the energy of the incident radiation. Proportional detectors typically require amplification circuitry in order to measure the charge.

Recently, new types of proportional gas-based radiation detector devices have been developed, including micropattern gas detectors such as cascaded Gas Electron Multipliers ("GEM"). These devices, which have been under development primarily for use in high-energy and nuclear physics, have many desirable properties as proportional gas detectors, but are limited to gains on the order of about $10^6$. Their use however, has been held back in large part due to avalanche-induced secondary effects associated with ion, electron, photon and metastable species feedback, as well as photocathode degradation caused by ion impact.

Based on the foregoing, there is a need for a radiation sensor with high resolution capability, fast pixel response, minimal dead-time, high gain, improved radioisotope identification, low power consumption, a thin profile and physically rugged, that can be manufactured in large sizes relatively inexpensively.

SUMMARY OF THE INVENTION

One embodiment of the present invention is a radiation counting detector that includes a first substrate, and a second substrate that is generally parallel to first substrate and forms a gap with the first substrate. A gas is contained within the gap. A photocathode layer is coupled to one side of the first substrate and faces the second substrate. A first electrode is coupled to the second substrate and a second electrode is electrically coupled to the first electrode. A first impedance is coupled to the first electrode and a second impedance is coupled to the second electrode. A power supply is coupled to at least one of the electrodes. A first discharge event detector is coupled to the first impedance and a second discharge event detector is coupled to the second impedance. The radiation counting detector further includes a plurality of pixels, each capable of outputting a gas discharge pulse upon interaction with radiation received from the photocathode. Each gas discharge pulse is counted as having an approximately equal value. The radiation counting detector further includes circuitry for detecting if a gas discharge pulse is output from the pixels, and for counting each gas discharge pulse as an individual event.

DETAILED DESCRIPTION

Figure 1:
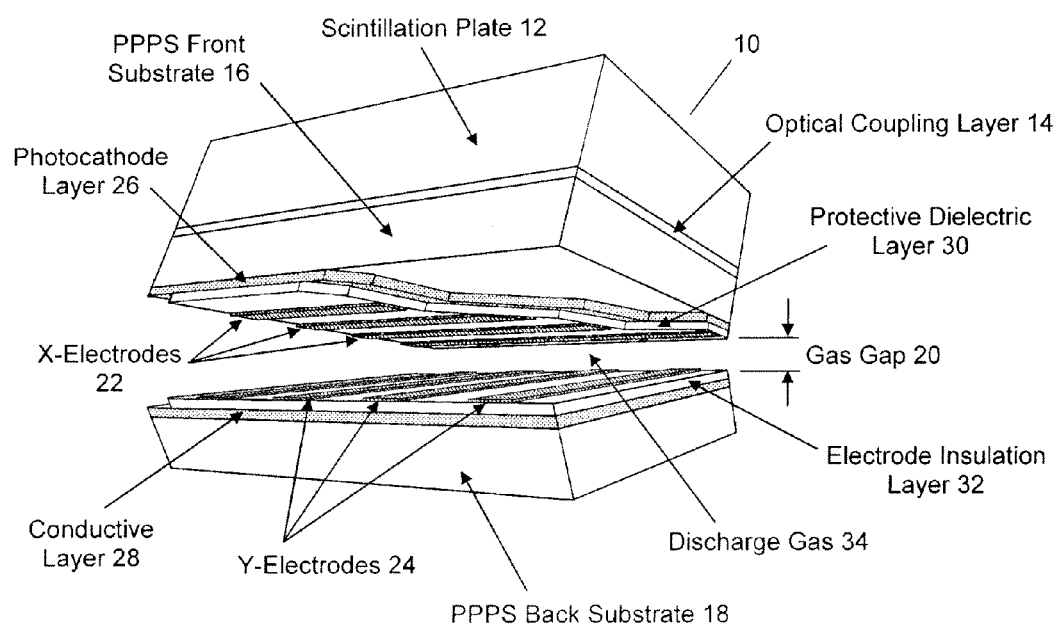
FIG. 1 is a perspective view of a columnar-discharge plasma panel photosensor ("PPPS") detector that includes a scintillation plate in accordance with one embodiment of the present invention.

One embodiment of the present invention is a device that enhances the capability and/or reduces the cost for detecting radiation for ionizing particles and photons, as well as non-ionizing photons such as "optical" photons. Embodiments do not record the magnitude of a given cell gas discharge as do most prior art detectors that operate in the linear region as proportional devices, but instead operates in the non-linear region with extremely high gain and is able to employ Geiger-Mueller type counting methods in assigning essentially the same value to each event regardless of the cell discharge magnitude. Embodiments of the present invention are therefore inherently digital in nature and can be highly pixelated, can utilize low cost materials and fabrication processes, and are extremely rugged and capable of operating under challenging ambient conditions including high magnetic fields. One embodiment comprises a plasma panel device designed to operate as a high gain, highly pixelated, digital photodetector by incorporating, in part, an internal photocathode that can be optically coupled to a scintillation plate and/or various other luminescent materials.

One embodiment couples a plasma panel sensor ("PPS") disclosed in U.S. patent application Ser. No. 11/155,660, the disclosure of which is herein incorporated by reference, with an internal photocathode sensitive to "optical" photons (and eliminates the PPS conversion layer), to form a hybrid gaseous-solid state device that is referred to as a plasma panel photosensor ("PPPS") to achieve unexpected results. In all embodiments, the resulting PPPS is a highly-pixelated and inherently-digital radiation detector, and requires little or no signal amplification and can be configured to achieve high angular resolution (e.g., Compton telescope) with good spectroscopic sensitivity across an extremely broad energy range—e.g. from low-keV to high-MeV for ionizing radiation, and from the UV to near-IR for "optical" photons.

The PPS disclosed in U.S. patent application Ser. No. 11/155,660 includes a conversion plate or conversion layer that absorbs "ionizing" radiation, but does not include photocathodic type materials and therefore is able to be directly exposed to the outside atmosphere and ambient illumination without adverse consequence. In contrast, embodiments of the present invention do not generally employ the conversion plate or conversion layer as described in U.S. patent application Ser. No. 11/155,660, but include an internal photocathode or photocathode layer adapted to detect "optical" (e.g. UV-visible) photons and so need to be generally protected from exposure to the outside atmosphere and ambient illumination. Embodiments of the present invention therefore generally interact with "ionizing" radiation indirectly by being coupled, for example, to a scintillation plate.

Embodiments of the PPPS detector offer a number of significant improvements relative to known radiation detectors, including: (1) it can be used for high-resolution digital radiography, radiation source imaging, computed tomography, source isotope identification, neutron activation spectroscopy, free-space optical communication, chemical and biological species detection, optical photon based chemical sensors and/or biosensors; (2) it is a highly-pixelated, high-gain, intensity sensitive, digital detector without the use of A/D converters; (3) it is a rugged, large area, flat-panel type detector with excellent position-sensitive capability; (4) it provides high-level performance under challenging and/or difficult environmental conditions with insensitivity to magnetic fields, low susceptibility to radiation damage and generally low power consumption; (5) it has a potentially order-of-magnitude cost reduction compared to a number of current detection techniques, especially for large area, rapid response, radiation detection systems; and (6) it has a thin device cross-sectional profile facilitating operation in a variety of vertically-stacked array configurations and apparatus for enhanced efficiency and/or improved performance including system designs such as coded-apertures, double-scatter kinematics, Compton telescopes, etc.

FIG. 1 is a perspective view of a columnar-discharge plasma panel photosensor ("PPPS") detector 10 that includes a scintillation plate 12 in accordance with one embodiment of the present invention. PPPS detector 10 includes a front substrate 16 optically coupled through an optical coupling layer 14 to the scintillation plate 12. PPPS detector 10 includes a back substrate 18 that is separated from front substrate 16 by a gas-filled gap or discharge gap 20 that is filled with discharge gas 34. In one embodiment, scintillation plate 12 also functions as the front substrate and therefore optical coupling layer 14 is not included.

Detector 10 further includes X-electrodes 22 (e.g., rows), and Y-electrodes 24 (e.g., columns). Detector 10 also includes a photocathode layer 26 and a back substrate conductive layer 28 that can bleed off accumulated charge on a back substrate electrode insulation layer 32. Detector 10 further includes a front substrate "ultra-thin" protective dielectric layer 30 that can protect photocathode 26 from degradation due to ion bombardment and maintain the integrity of X-electrodes 22, which along with the Y-electrodes 24 define the PPPS pixel structure.

In one embodiment, the charge that collects on the back dielectric surface between adjacent Y-electrodes 24 does not interfere with the operation of detector 10 and so conductive layer 28 and electrode insulation layer 32 are not needed. In this embodiment, Y-electrodes 24 are deposited directly on the interior surface of back substrate 18 in an embodiment that substrate 18 is formed of a dielectric material such as glass. In one embodiment, photocathode 26 can bleed off any stored charge that might tend to accumulate on ultra-thin protective dielectric layer 30. In another embodiment a transparent conductive coating (e.g. ITO or SnO) can be deposited on front substrate 16 directly beneath photocathode 26 to improve the conductivity of the photocathode and assist in removal of stored charge from protective dielectric layer 30.

Detector 10 of FIG. 1 does not include barriers, and in one embodiment operates in a direct current ("DC") mode. In another embodiment, detector 10 may operate in a non-conventional manner, such as without dielectric over the electrodes in an alternating current ("AC") mode. In one embodiment, protective dielectric layer 30 is extremely thin (e.g., less than or on the order of 0.01 µm) so as to better allow photoelectrons emitted by photocathode 26 to reach gas 34. In this embodiment, dielectric layer 30 may be too thin to act as a fully functional insulator between photocathode 26 and X-electrodes 22, and dielectric breakdown might occur in the narrow overlap region between photocathode 26 and under the X-electrode if the voltage difference between these two layers becomes significant (e.g., greater than about 1 volt). However the possibility of some dielectric breakdown between these layers in one embodiment is not problematic and in fact may be beneficial because the breakdown will short out any significant potential difference between the layers and thus re-establish and maintain the desired low value which most likely would be close to a zero voltage bias. A dielectric breakdown may likely not occur in some embodiments, as many semiconductor devices (e.g., transistors built using a 90 nm CMOS process) employ an even thinner 1.2 nm insulation layer for the gate dielectric and are only about 5 silicon atoms thick. In these known devices, the transistor gate dielectric is typically formed from $SiO_2$ which is typically used with a bias on the order of about one volt, thus the gate dielectric requirements for $SiO_2$ are more stringent than those anticipated for protective dielectric layer 30, as disclosed below.

In one embodiment, the potential difference or bias between the X- and Y-electrodes 22 and 24 (e.g., cathode and anode for device 10 in a DC configuration), is in the general range of 300 to 1000 volts depending upon specific device design and materials (i.e., including such key parameters as gas composition, gas pressure, discharge gap, electrode resolution, etc.). In one embodiment, the configuration and materials used for back substrate 18 can generally mirror those chosen for front substrate 16. In one embodiment, protective dielectric layer 30 is formed from a coating thickness on the order of 4 nm of the dielectric CsBr (dielectric constant of 6.5 as compared to 4.5 for $SiO_2$) and protects photocathode layer 26, which can be formed from CsI, $Cs_2Te$, $K_2CsSb$ or any one of a number of various other photocathodic materials. Since Cs has about twice the atomic diameter of Si, and the Si dielectric works at a thickness of 1.2 nm, a Cs based dielectric can be effective at a thickness of about 2.5 nm, and so a 4 nm thick layer should function as a reasonable insulator.

In one embodiment, the position of photocathode layer 26 on the front substrate 16 (transmissive mode) can be moved to the back substrate (reflective mode) and would replace conductive layer 28 which would no longer be needed. In this embodiment, "ultra-thin" protective dielectric 30 on the front substrate would also be moved to the back substrate to similarly replace electrode insulation layer 32. As a result of these changes, Y-electrodes 24 on the back substrate (in this reversed photocathode configuration) function as the cathode with typically only about one volt of potential bias difference between the back substrate photocathode and the Y-electrodes. In order to enhance the transmission efficiency of photons from scintillation plate 12 reaching the photocathode, which is now on the back substrate, X-electrodes 22 on the front substrate should be made as transparent as possible (e.g., ITO or SnO).

PPPS detector 10 of FIG. 1, and the additional PPPS detector embodiments disclosed below, operate as highly-pixelated radiation detectors with their pixels briefly turning "on" (i.e., they are normally "off") and thereby being counted in direct proportion to incoming radiation, and so at their most basic level function as digital radiation counters with the addition of counting circuitry disclosed below. Further, since these detectors do not operate in the proportional region, each such pixel gas discharge pulse or event is considered to have approximately an equal discharge value (i.e., current) and from an information processing or detection point of view is simply counted as a single event. Therefore, embodiments of the present invention are not considered proportional detectors.

In embodiments of the present invention, all radiation induced pixel discharges begin (i.e., are turned "on") by initially maintaining the panel voltage just below its spontaneous discharge setting, such that any free-electron upon entering the gas can quickly set off a discharge at the nearest pixel site which can very rapidly (e.g., estimated response time on the order of about 10 ps) grow into a localized high-gain avalanche. In accordance with some embodiments, the free-electron is generated via a two-step process in which the incident radiation first interacts with a top scintillator "plate" (or crystal, or other such top luminescent material layer or coating) such as scintillation plate 12 of FIG. 1, to emit "optical" photons that can interact with the photocathode layer within the PPPS, which in-turn emits photoelectrons (i.e., free-electrons) into the gas. The actual pixel sensing and counting can be performed by circuitry such as digital (i.e., photon-counting) acquisition electronics to store time-tagged pixel discharge information and correlated X-Y events.

PPPS detector 10 in accordance with embodiments of the present invention is generally a direct, high-gain, position and intensity sensitive, digital counter/detector of "optical" photons. A single solitary photoelectron (i.e., free-electron) upon entering the high field, high resolution, pixel space of a suitably designed plasma panel cell, can, in accordance with the various embodiments of the present invention, experience almost instantaneous internal electron amplification with a gain of approximately eleven orders-of-magnitude, without external amplification and without loss of spatial resolution. The resulting electron avalanche, which can be both confined and self-contained within the region that defines each pixel's cell space, generally occurs on the sub-nanosecond time scale. The incident flux or intensity sensitivity is measured by the number of cells firing repeatedly. Given the extremely fast pixel response time and therefore the high counting rate capability of the PPPS, coupled with the dense pixel structure, the total number of discharging cells should be proportional to the incident radiation flux. However, the number of "adjacent" or "near-adjacent" pixels discharging "simultaneously" should correlate to the number of photons generated in the scintillation plate by a single "hit" and hence the energy originally deposited by the incident photon or particle. Thus the total number of gas discharge events within a tight grouping (both spatially and temporally) is proportional to the incident photon or particle energy that originally gave rise to this burst of discharge events, whereas the total number of such groupings or bursts is proportional to the incident radiation flux.

In some embodiments of the invention, as disclosed below, the PPPS detector does not require the use of scintillation plates or crystals. Similarly, most embodiments do not require the use of high-pressure, expensive, high-purity isotopic gases such as $^3He$ or $^{10}BF_3$, although such gases might be useful for certain applications.

Figure 2:
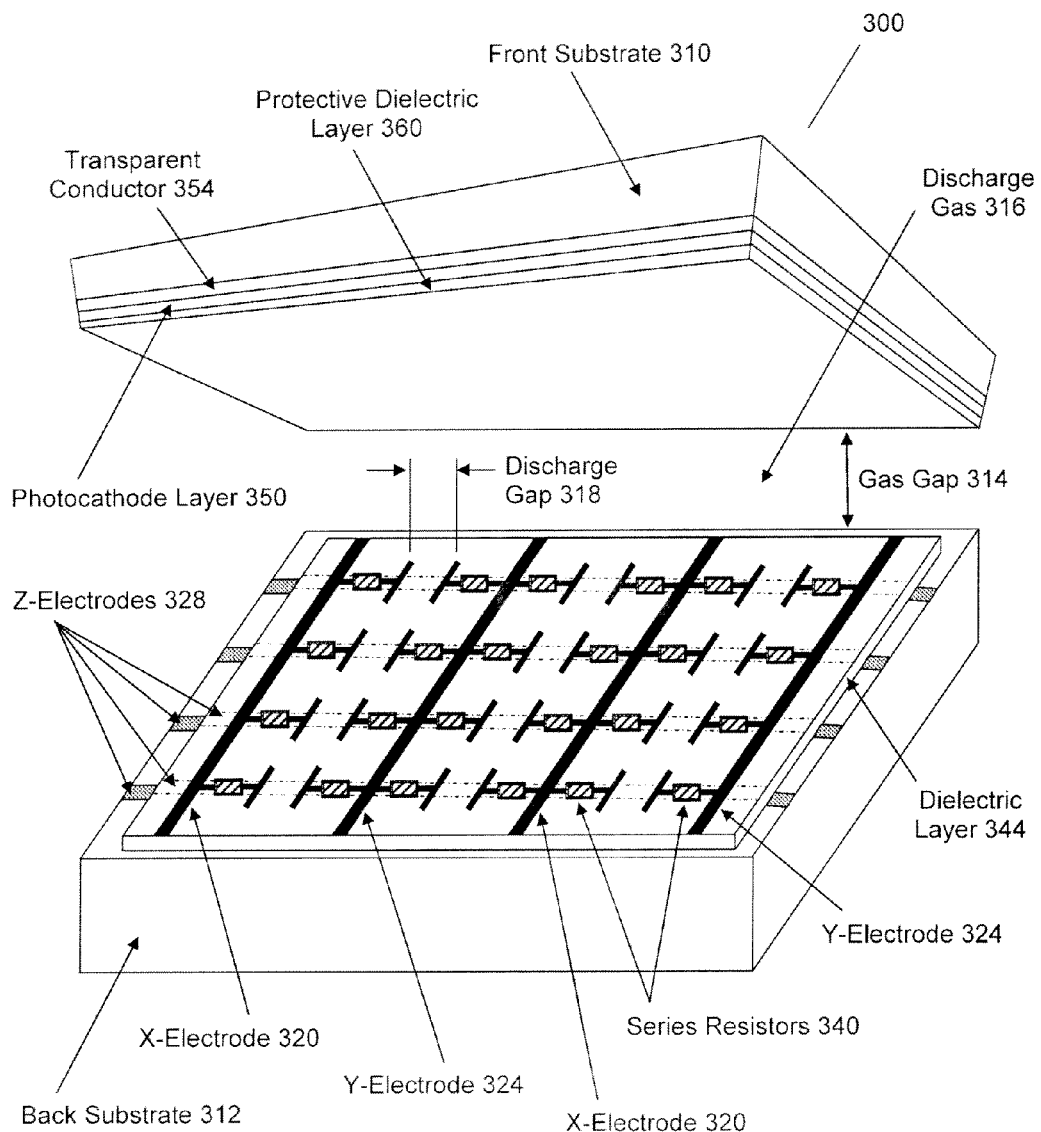
FIG. 2 is a perspective view of a surface-discharge PPPS detector with a parallel/rectilinear electrode pattern in accordance with one embodiment of the present invention.

FIG. 2 is a perspective view of a surface-discharge PPPS detector 300 in accordance with one embodiment of the present invention. In one embodiment, detector 300 operates in the DC mode, but as with device 10 of FIG. 1, it could be adapted to operate in the AC mode. Detector 300 includes a front substrate 310 and a back substrate 312 separated by a gas-filled gap 314. Detector 300 further includes a photocathode 350 facing discharge gas 316. In one embodiment, a scintillation plate may be used as front substrate 310 in which case an external optical coupling layer (not shown) would not be needed. In another embodiment, a scintillation plate may be added and optically coupled to front substrate 310 in a manner analogous to that disclosed in FIG. 1.

Radiation detector 300 further includes surface-discharge X-electrodes 320 and Y-electrodes 324, which together define a pixel structure that in response to an emitted electron from photocathode 350 can cause a surface-discharge shaped avalanche across gas-discharge gap 318 resulting in a gas-discharge counting event, disclosed below. Detector 300 further includes a current-limiting series resistor 340 (i.e., impedance) on each surface-discharge electrode in each discharge cell. Detector 300 may further include a back substrate dielectric layer 344 which is used as an insulating layer in one embodiment where detector 300 includes orthogonally oriented, auxiliary Z-electrodes 328 for locating the orthogonal position of a surface discharging X-Y pixel. In one embodiment, an ultra-thin protective dielectric layer 360 is used to protect photocathode 350 from ion bombardment and can be formed as previously disclosed in conjunction with FIG. 1 from a coating thickness on the order of 10 nm or less of a suitable dielectric such as CsBr. In one embodiment, Z-electrodes 328 are deposited directly on top of back substrate 312 but beneath dielectric layer 344. The Z-electrodes in the above embodiments are not gas-discharge electrodes but are low-current "auxiliary" electrodes that can assist in sensing the location of a high-current avalanche event between X-Y surface-discharge electrodes 320 and 324. Further, in one embodiment detector 300 includes the transparent conductor 354 (e.g., ITO or SnO) to enhance the electrical performance (e.g. conductivity) of photocathode layer 350 should it be needed. Further, in one embodiment, if charge accumulation on the top layer of the portion of back substrate 312 which faces gas 316 is deemed a problem, then Z-electrodes 328 can be used to drain this charge, or in an embodiment that does not include Z-electrodes, a conductive coating, similar to layer 28 in FIG. 1 or layer 354 in FIG. 2, could be deposited on back substrate 312. As previously disclosed in conjunction with detector 10, in one embodiment of the above surface-discharge PPPS detector the positions of the photocathode and electrodes can be reversed, along with associated electrode circuitry (e.g., resistors), dielectric layers, etc. For this reversed surface-discharge PPPS embodiment the photocathode operates in the reflective mode on the back substrate instead of the transmissive mode on the front substrate. Further, to enhance the transmission efficiency of "optical" photons reaching a back substrate photocathode, the electrodes on the front substrate should be made as transparent as possible (e.g., ITO or SnO).

FIGS. 1 and 2 illustrate the interior cross-sectional structure of PPPS detectors 10 and 300. In addition, embodiments of these detectors further include a hermetic seal (not shown) to contain the discharge gas. In one embodiment, the hermetic seal is along the entire outer perimeter or is an external structure that surrounds the detectors. Numerous spacers may be included inside the seal to maintain the correct gas gap.

Figure 3:
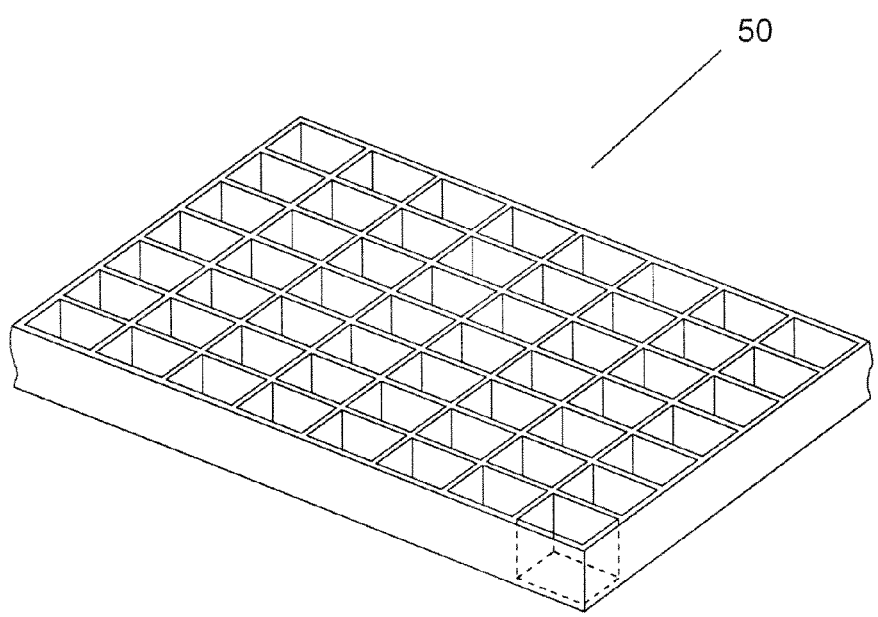
FIG. 3 is a perspective view of a barrier structure in accordance with one embodiment that can be used with the disclosed detectors.

In one embodiment, PPPS detectors 10 and 300 include a barrier structure that is located between the two substrates for the purpose of physically and electrically isolating each pixel or gas-discharge cell. FIG. 3 is a perspective view of one such barrier 50 in accordance with one embodiment that can be used with the disclosed detectors. Barrier 50 includes rectangular walls that surround each pixel cell in a symmetrical fashion with the barrier opening centered with respect to the center of each pixel discharge site. However many other barrier structure configurations can be used, including shapes that could be described as diamond-patterned, honeycomb, egg crate, cylindrical, triangular, saddleback-shaped, shadow masks, etc. These various shaped barrier structures, as well as numerous others designed for similar purposes to physically and electrically isolate individual pixels or groupings of such pixels in plasma display panels ("PDP's"), are known structures that have been developed over many years for the TV-set industry.

In one embodiment, PPPS detectors 10 and 300 and other embodiments disclosed below may be structured to function as either AC or DC devices. In one embodiment, the DC PPPS detector is configured as a "columnar-discharge" detector as shown in FIG. 1 structured with a "bare" cathode (X-electrodes 22) facing a "bare" anode (Y-electrodes 24) with no dielectric layer in between the electrodes and separated by a gap 20 that is filled with discharge gas 34. In this embodiment, the DC detector is normally kept at a constant "ready-to-discharge" voltage via direct connection to a steady, well-regulated DC power supply circuit. In contrast, for the AC detectors, the discharge electrodes constantly cycle back and forth between two effectively opposite voltage plateaus and are therefore in a receptive (i.e., ready-to-discharge) state for only a part of each cycle. For these transition periods during which the voltage is changing, the device will be unresponsive (i.e., experience dead-time) and any radiation generated free-electrons that manage to find their way into the gas will essentially be "lost" (i.e., not counted). In addition, all AC PPPS detectors (with or without the scintillation plate 12 and optical coupling layer 14) with a conventional (i.e., charge storing) dielectric layer over the X- and Y-electrodes include significantly complex drive-waveforms incorporating dielectric wall-charge erase functions for neutralizing accumulated charge stored from previously lit "on" pixels. Further, commercial AC plasma display panels ("PDP's") typically have a thick-film dielectric coating over the electrodes greater than 10 μm, and often 20 to 40 μm, which is much too thick to efficiently allow any photoelectrons generated by a photocathode layer underneath such a dielectric pass through and reach the gas. For this reason, AC PPPS devices in one embodiment do not include the columnar-electrode structure as shown FIG. 1 if the device incorporates a thick-film dielectric layer over the X-electrode. However if there is essentially no dielectric over X-electrode 22 as shown in FIG. 1, then a "bare-electrode" columnar-discharge AC PPPS detector can be implemented.

AC PPPS detectors in accordance with other embodiments can also be fabricated based on surface-discharge electrode structures such as shown for the PPPS detector of FIG. 2, with the X- and Y-electrodes both on one substrate and the photocathode on the other. For these configurations, a conventional dielectric layer (e.g., 10 to 40 μm thick) can be employed over the two discharge electrodes (i.e., X and Y) because this thick dielectric layer would not be in contact with the photocathode. In another embodiment, a top thin-film MgO refractory coating (e.g., 0.1 to 1 μm thick), such as that employed for commercial "PDP's", can be applied either directly over the X- and Y-electrodes or over the above-described conventional (i.e., thick) dielectric on top of these two electrodes to provide a more stable and improved sputter-resistant electrode surface. The AC PPPS thin-film overcoat layer (e.g., MgO) might be further improved in terms of its probability of directly interacting with ionizing radiation (i.e., via absorption and/or inelastic scattering), by replacing the low-Z (i.e. "Z" as used here being the atomic number according to convention), "standard PDP" emissive MgO coating with a higher-Z emissive coating such as $La_2O_3$, $Eu_2O_3$, etc. However all such candidate emissive thin-film overcoat layers should, like MgO, be chemically and thermally stable, sputter-resistant, and thermally activated at process-compatible temperatures.

One further advantage in replacing the "standard" MgO coating with a different thin-film dielectric material is that MgO promotes "exoemission" of free-electrons (i.e., exoelectrons) into the gas in AC PDP devices. The mechanism of exoemission, also called relaxation electron emission, can proceed via a multitude of pathways, but most commonly involves the release and transfer of energy from trapped charge carriers to an electron that can escape into the gas. This "spontaneous" electron emission process from a dielectric can occur a long time after the original excitation, from seconds to months, and can therefore be a source of background noise in an AC (or even a DC) PPPS detector. One way to reduce the impact of such background noise is by reducing the surface area of all dielectrics, and by minimizing dielectric defects and strains in the manufacturing process (e.g., annealing). In another embodiment, the AC PPPS detector can be employed without any type of charge-storing dielectric layer. In one embodiment, the surface-discharge AC PPPS detector could look identical to the DC PPPS structure shown in FIG. 2. Depending upon the application, the surface-discharge structure in FIG. 2 could be used with or without a scintillation plate and optical coupling layer (e.g., as shown in FIG. 1). Yet even in DC PPPS detectors, the X and Y discharge electrodes should still be on top of and separated by a dielectric surface which interfaces with the gas, so some level of spontaneous exoemission (i.e., electronic noise) will generally always occur.

Figure 4:
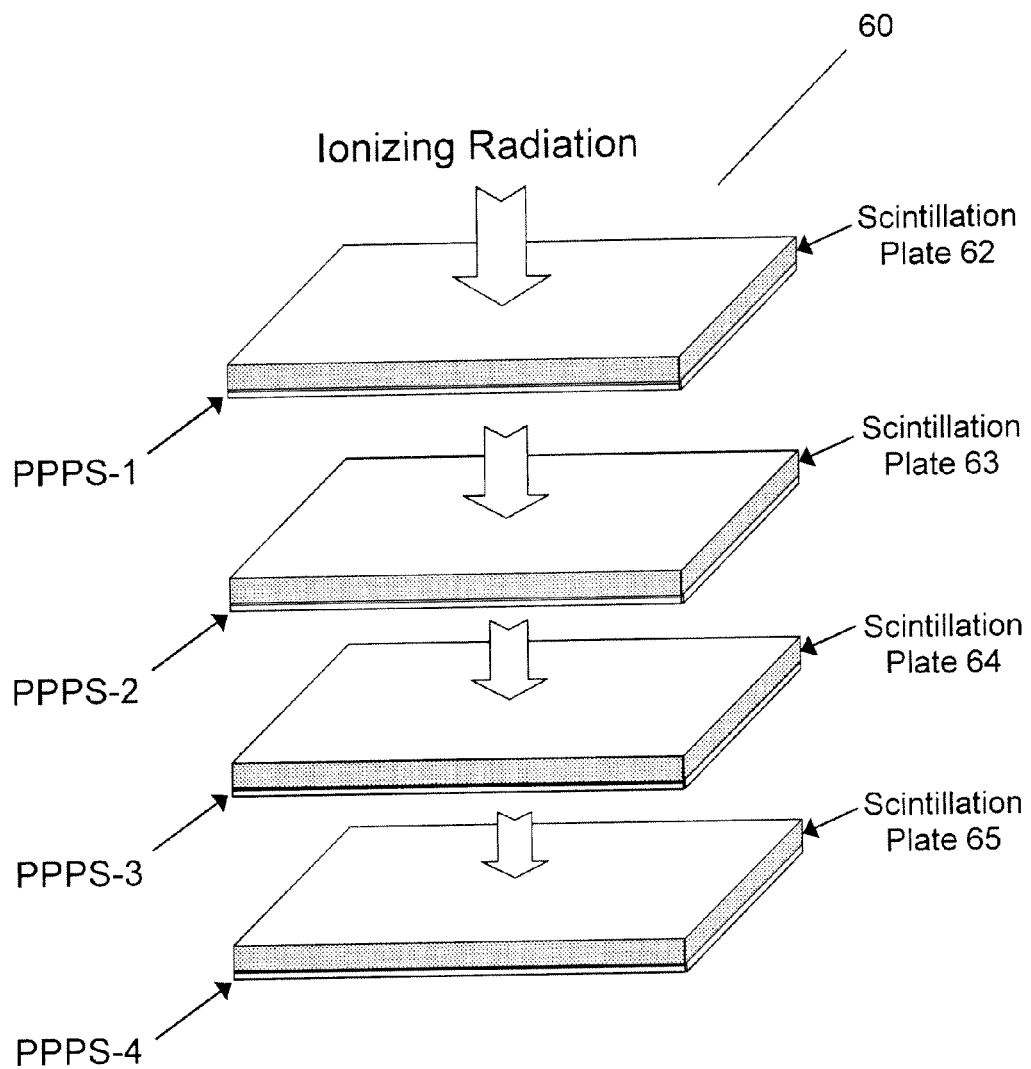
FIG. 4 is a perspective view of a vertically-stacked PPPS scintillation detector in accordance with one embodiment that includes stacked scintillation plates.

In one embodiment, to enhance the positional or angular resolution of a PPPS scintillation detector, the uncertainty of the reaction site location for a particular radiation absorbing or scattering event in a "thick" scintillation plate or crystal can be reduced by vertically-stacking an "equivalent" number of "thinner" scintillation plates, each optically coupled to a PPPS. FIG. 4 is a perspective view of a vertically-stacked PPPS scintillation detector in accordance with one embodiment that includes stacked thin scintillation plates 62-65. The thinner the scintillation plate, the greater the number of vertically-stacked PPPS-scintillation detectors required to achieve a given level of radiation interaction (e.g., absorption or scattering). However, the thinner the scintillation plate, the smaller the uncertainty with respect to reaction site location, hence the better the overall positional and/or angular resolution of the integrated PPPS-scintillation detection system. Therefore, to achieve improved positional and/or angular resolution in this type of vertical-stacked detection system requires thin, flat panel, PPPS devices. In general, the greater the level of stacking (i.e., number of stacked plates) the better the positional/angular resolution, but also the larger the area of PPPS devices needed. Thus only a low cost detector technology such as the PPPS can be fully-exploited for such configurations as most other flat radiation detectors (e.g., semiconductor based devices) would not be affordable. The extra degree of freedom associated with vertical-stacking also allows for a variety of innovative hybrid structures, such as having different spectral response optimized devices on top of each other, or integrating gamma-ray detectors with neutron detectors, etc.

Figure 5:
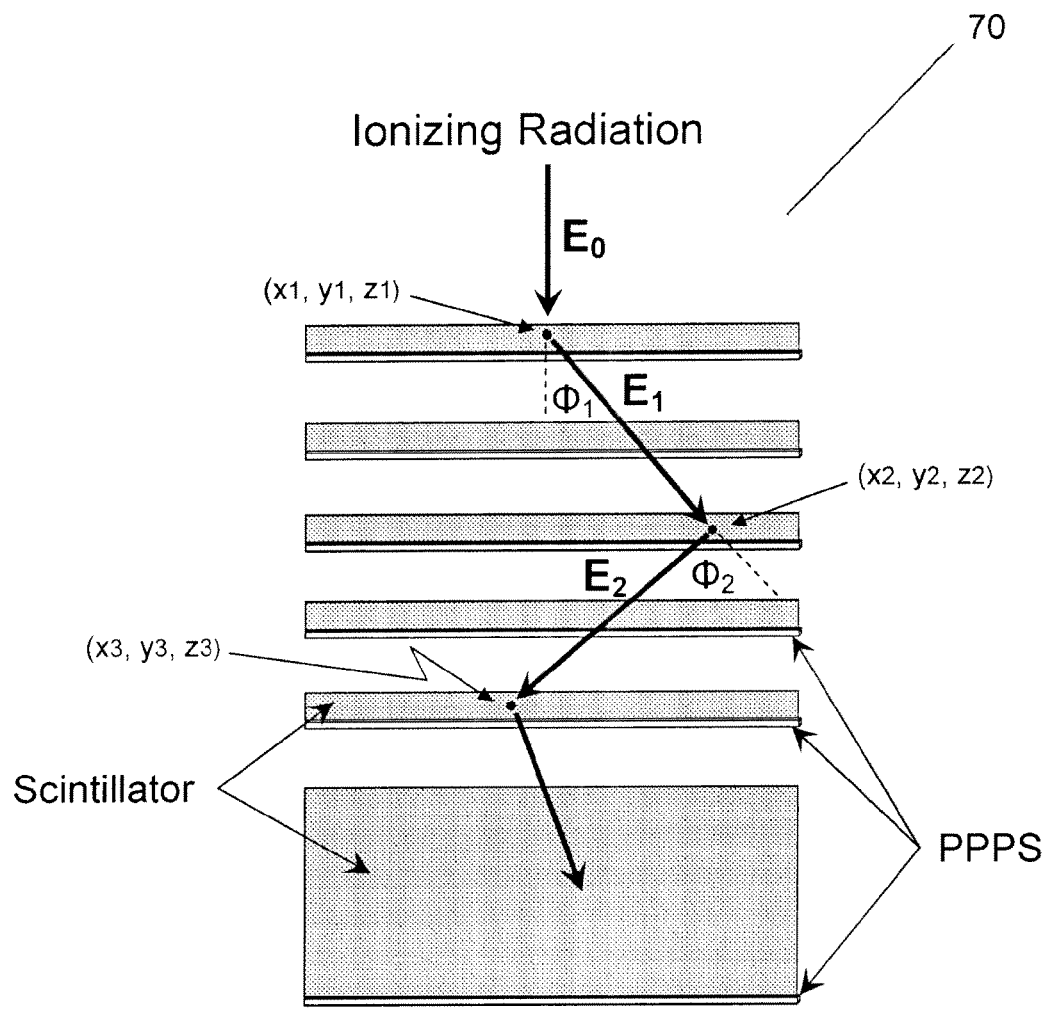
FIG. 5 is a perspective view and schematic showing a sequential multiple scattering event within a vertically-stacked PPPS-scintillation detector in accordance with another embodiment of the present invention.

FIG. 5 is a block diagram of a vertically-stacked PPPS-scintillation detector 70 in accordance with another embodiment of the present invention. Detector 70 represents a Compton telescope arrangement that can exploit the physics of tracking multiple sequential Compton scattering events. Some advantages of the Compton telescope configuration of FIG. 5 is the ability to improve system efficiency, spectroscopic energy resolution and angular resolution by in part the elimination of collimation optics, although other system configurations such as coded-apertures could also achieve some of these benefits with a different set of trade-offs using the PPPS-scintillation detector. In one embodiment, detector 70 utilizes a technique known as the "3-Compton method".

For all PPPS gas discharge type detectors disclosed above (both AC and DC), a simple relationship known as the Paschen curve gives the firing or breakdown voltage as a function of the product of gas pressure and discharge gap. Based on this classical relationship, PPPS internal gas pressure should be increased as the device pixel pitch decreases. For very high pixel resolutions, it could thus be advantageous to increase the internal panel gas pressure above one atmosphere. However, from a mechanical design viewpoint, it may be difficult to maintain a uniform gas gap in a plasma panel such as that shown in FIG. 1, having a total thickness of only about 1 mm while holding a positive internal gas pressure. In one embodiment, the scintillation plate/crystal materials of the detectors, such as plate 12 of FIG. 1, are hydroscopic and therefore have an encapsulation package or mechanical housing to maintain an inert or dry atmosphere. In this embodiment, the gas atmosphere within the mechanical housing may be adjusted such that it approximately matches the PPPS positive gas pressure, thereby eliminating any significant pressure differential acting upon the PPPS structure. Thus by utilizing an integrated housing system design, the PPPS should be able to maintain a uniform gas gap in a positive pressure device, regardless of the particular configuration or how thin the device might be. In other embodiments, instead of using a conventional two plate device structure such as that shown in FIGS. 1 and 2, some PPPS configurations can internally contain a positive gas pressure within a fully-encapsulated, closed-cell, microcavity-based, gas discharge pixel structure as disclosed below.

Figure 6:
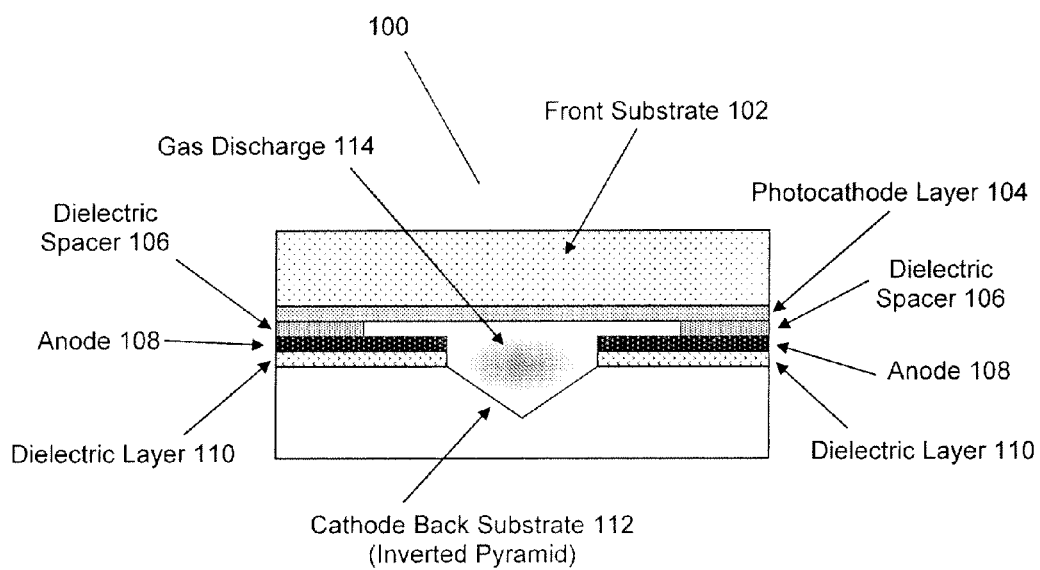
FIG. 6 is a cross-sectional view of a microcavity-PPPS detector configured to operate as a DC device in accordance with one embodiment of the present invention.

FIG. 6 is a cross-sectional view of a microcavity-PPPS detector 100 configured to operate as a DC device in accordance with one embodiment of the present invention. Detector 100 includes a front substrate 102 which is transparent (e.g., glass) to the incident radiation of interest. Detector 100 further includes a photocathode layer 104 deposited on the inside surface of substrate 102 and in contact with the PPPS gas, which in-turn can form a gas discharge 114 between an anode 108 and a cathode 112. In one embodiment, an ultrathin protective dielectric layer (such as CsBr disclosed above) is applied over photocathode 104. In another embodiment a transparent conductive layer is deposited between photocathode 104 and front substrate 102 to enhance the photocathode electrical properties (e.g., conductivity). Cathode 112 has an inverted pyramid structure that can be formed, for example, by the wet-etching of a silicon-based substrate such as p-Si, although any material that can be suitably fabricated to form a microcavity type structure can be used.

In order to electrically isolate anode 108 from cathode 112, a dielectric insulation layer 110 is deposited that can be patterned (e.g., by photolithography) as shown in FIG. 6. In one embodiment, dielectric layer 110 has a thickness between a few microns to tens of microns thick and is fabricated from a material compatible with the cathode substrate—e.g., silicon nitride ($Si_3N_4$), silicon dioxide ($SiO_2$), etc. In one embodiment, front substrate 102 and back substrate 112 can be electrically isolated via a dielectric spacer layer 106 which can be deposited on top of anode 108. The anode material should be fairly sputter-resistant. An example of one such material is nickel with a typical thickness of about 1 μm. In order to fabricate a microcavity-PPPS-scintillation detector, a scintillation plate and optical coupling layer, as shown in FIG. 1, is added to front substrate 102. In addition to having the capability of operating at a positive gas pressure, a second advantage of the microcavity-PPPS is being able to attain a fully-encapsulated, self-contained, gas-discharge without the complication of having to fabricate an internal barrier structure. Other embodiments containing different shaped microcavities also exist, including such geometries that are cylindrical, spherical, hemispherical, conical, etc.

Figure 7:
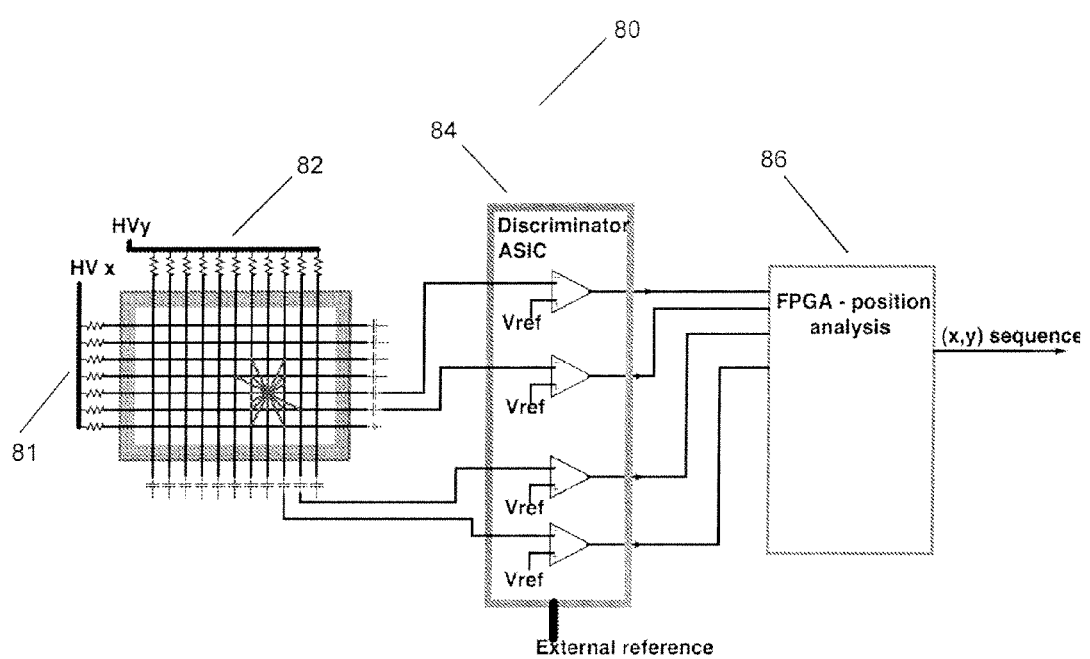
FIG. 7 is a block diagram of a counting circuit in accordance with one embodiment of the present invention.

In one embodiment, photon-counting (i.e., pulse detecting) type electrode circuitry for detecting each gas discharge cell interaction and counting each such interaction as an individual pixel discharge event is coupled to the PPPS detectors disclosed above. FIG. 7 is a block diagram of a counting circuit 80 in accordance with one embodiment. In FIG. 7, X- and Y-electrodes, 81 and 82, are shown as being in an orthogonal arrangement (i.e., rows and columns) such as that shown in FIG. 1. However the X- and Y-electrodes are not restricted to orthogonal patterns and can be configured in any such way consistent with being able to count and record pixel discharge events. For example, one alternative X-Y configuration is shown in FIG. 2, in which the X and Y discharge electrodes are patterned in a surface-discharge type parallel arrangement, but can still employ electrode readout circuitry such as that shown in FIG. 7. Another example is the configuration shown in FIG. 6. Further, the counting circuitry used with the PPS, disclosed in U.S. patent application Ser. No. 11/155, 660, the disclosure of which is herein incorporated by reference, may also be used with embodiments of the present invention. The circuitry disclosed above can utilize any one of a number of current-limiting impedance component arrangements with regard to the two, gas-discharge electrodes (e.g., variously described as X and Y, or cathode and anode, or row and column), which are in-turn coupled to the event counting detection electronics shown in, for example, FIG. 7.

The various embodiments of the detectors of the present invention as disclosed herein, and as illustrated by the circuitry shown in FIG. 7, are fundamentally digital in nature and as such the detection electronics does not record the magnitude of a given cell discharge as does most "conventional" detectors operating in the linear region as proportional detectors, but instead operates in the non-linear region and can employ Geiger-Mueller type counting techniques/circuitry, thus assigning essentially the same value to each event regardless of the cell discharge magnitude. Embodiments of the present invention can use circuitry to acquire pixel discharge data by utilizing standard point scanning, line scanning, or area scanning techniques.

Circuit 80 further includes a discriminator 84 to produce logic pulses which can then be fed to an array of field-programmable gate array ("FPGA") logic arrays 86. FPGA arrays 86 can perform the calculation of the position for each hit, and emit a stream of time-stamped (X,Y) coordinates. For the embodiment of the PPPS-scintillation detector shown for example in FIG. 1, a radiation hit or interaction within the scintillator plate should generally cause a shower of photons and subsequent photoelectrons to enter the space of the immediate nearby cells and thus initiate numerous pixel discharges resulting in a plurality of counting events. Discriminators 84 must therefore be able to identify multiple hits on each electrode, and send this count information to FPGA 86.

In one embodiment, to accurately record the number of hits on a wire if they get too large, the readout electronics are organized via a grid type of architecture that monitors, records and integrates the individual event counting results from a number of smaller sub arrays, thus requiring that more wires be brought out to reduce the number of coincident events along an extended length of electrode wire. Bringing out more wires require more, but simpler, discriminators.

In terms of avalanche control and cell discharge characteristics, the circuit performance can generally be enhanced by the addition of an appropriate current-limiting series resistor(s) and/or possibly other support circuitry within each cell, or within a grouping of such cells, such as shown in FIGS. 2 and 7. Such resistor configurations or groupings can serve to decouple neighboring pixels from each other, thus limiting or quenching the discharge before the avalanche can spread from one pixel to another. For example, a resistor can be used in each cell or in a string or grouping of cells for an electrode wire, with such electrode wires groupings configured to form a sub array within a larger PPPS array structure. Fabrication of the internal cell circuitry can normally be accomplished most economically by utilizing thick-film and/or thin-film deposited components (e.g. conductors, resistors, dielectrics, etc.), possibly in combination with thin-film amorphous (or low temperature polycrystalline) semiconductor multilayer circuit fabrication technology, such as that employed in the production of TFT-LCD's, etc. Such multilayer circuit design configurations can incorporate pixel I/O wires as well as circuit components such as resistors, diodes, insulators, etc., which can be fabricated and located inside, alongside or beneath the active pixel (i.e., discharge cell) surface structure or in a suitable location nearby. For the readout electronics of FIG. 7, the more complex system signal processing elements, which can include field programmable gate array ("FPGA") logic devices and associated discriminators, can be implemented with discrete or integrated components positioned along the panel periphery of the PPPS using, for example, chip-on-glass or chip-on-flex-circuit technology similar to that employed for connecting PDP driver chips to each electrode on a PDP glass substrate.

Embodiments of the present invention can be used for monitoring agents of bioterrorism and biowarfare, and can involve live-cell imaging and/or analysis, as well as molecular genetics, and can employ synthetic fluorophores, fluorescent proteins, immunofluorescence reagents and other intracellular derivatives in probing subcellular structures for use in DNA sequencing, in-vitro assays, chromosome analysis, genetic mapping, etc. Further, embodiments can be used for bioluminescent detection of bacterial contamination in the environment, including food, water and air. In these embodiments, the PPPS detector can be designed to function as a high resolution, high sensitivity, imaging device, or conversely as a non-imaging, large-area photosensor that can be tuned to detect specific wavelength emissions from "tagged" fluorescent species. In the latter embodiment, where X-Y positional sensitivity and imaging capability are not needed, the detection electronics can be greatly simplified. In one such embodiment, many if not all of the X-electrodes can be shorted together and connected to a single series resistor, as can be done for the Y-electrodes. For such embodiments, detection sensitivity would rely on the extremely fast, sub-nanosecond pixel response times discussed above in conjunction with detector 10. For example, if all X-electrodes were shorted through a single resistor, as were all Y-electrodes, then the above PPPS detector could reset itself each time a pixel discharge event occurred. If the detector discharge and reset time were 1 ns, then as many as $10^9$ events per second could be detected.

Numerous known methods exist for exciting tagged fluorescent chromophores including: UV-VIS light sources in combination with dichroic mirrors and filters, tunable lasers, fluorescence resonance energy transfer or FRET (also called Förster resonance energy transfer or dipole-dipole resonance energy transfer), and total internal reflectance fluorescence ("TIRF") with surface evanescent-wave coupling.

Figure 8:
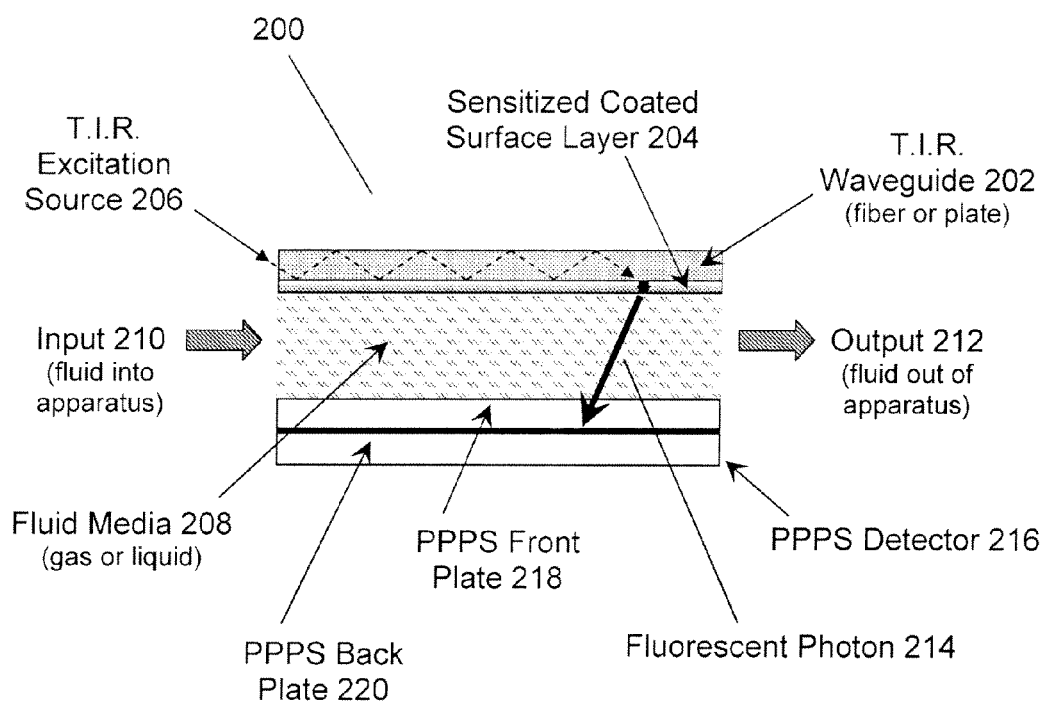
FIG. 8 is a cross-sectional view of a PPPS-total internal reflectance fluorescence ("TIRF") cell for collecting fluorescent photons in accordance with one embodiment of the present invention.

FIG. 8 is a cross-sectional view of a PPPS-TIRF cell 200 in accordance with one embodiment for collecting fluorescent photons 214, excited via the evanescent-wave from an external illumination source 206 (e.g., laser), propagating along an optical fiber waveguide 202 (or matrix of such fibers or an optical plate), by means of total internal reflection (T.I.R.). The evanescent-wave along the T.I.R. waveguide 202 can stimulate fluorescence from select molecules at or very near the surface interface with a fluid media 208. Fluid media 208, which may be liquid or gas, can be either static or dynamic in motion. In one embodiment, PPPS-TIRF cell 200 includes input 210 and output 212 circulation plumbing to allow fluid media 208 to flow through the cell cavity for sampling a much larger media volume than if the fluid sample volume were confined to the fixed dimensions of a static PPPS-TIRF cell design. For some embodiments, fluid media 208 is suitably transparent to the fluorescent photons 214 emitted at or near the coated surface layer 204 of the T.I.R. waveguide 202. This allows emitted photons 214 to reach and be counted by the PPPS-detector 216. Possible configurations for the T.I.R. waveguide 202 are those based on an optically flat plate structure such as a luminescent concentrator or a matrix of optical fibers.

Figure 9:
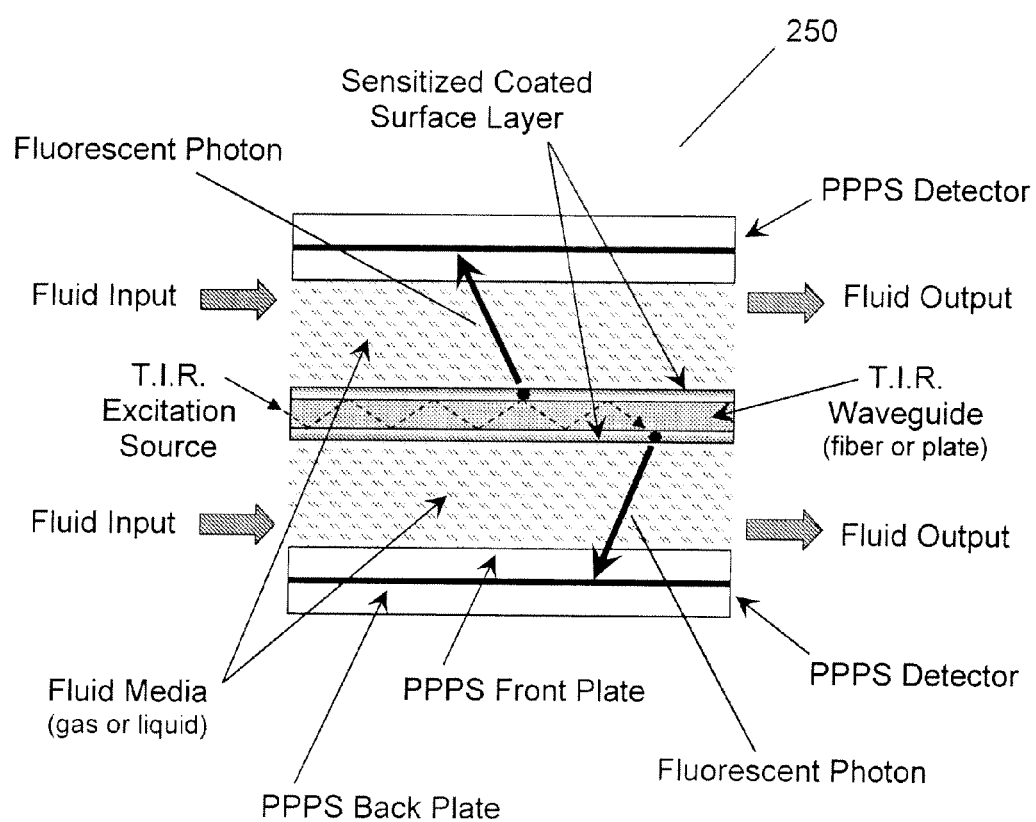
FIG. 9 is a cross-sectional view of a PPPS-TIRF dual cell in accordance with one embodiment of the present invention.

Embodiments of cell 200 of FIG. 8 can be used for a number of different applications by custom preparation of the sensitized coated surface layer 204. For example, an evanescent-wave biosensor for an antibody-based detection system for detection of biothreat agents can be adapted to PPPS-TIRF cell 200 to achieve improved biosensor sensitivity at reduced cost. FIG. 9 is a cross-sectional view of a PPPS-TIRF dual cell 250 in accordance with one embodiment. Cell 250 allows for the collection of the evanescent-wave fluorescence from both sides of the T.I.R. waveguide and can improve the efficiency of the cell. For example, for the evanescent-wave biosensor for an antibody-based detection system, capture antibodies can be coated either directly or indirectly (e.g., via a polymer such as polystyrene or other appropriate matrix) on the T.I.R. waveguide to form a sensitized coated surface layer 204. The sample fluid media would then be passed over the T.I.R. waveguide(s) with target analytes captured by the antibodies. Fluorophore-labeled reporter antibodies are then passed through the system and should bind to the captured target analytes on the waveguides. Fluorescent reporter molecules within approximately 1 µm of the waveguide surface would be expected to be excited by the evanescent field of the excitation source (e.g. laser), with many of the resulting fluorescent photons captured and recorded by the PPPS-detector. Because of the large area, high gain, direct-digital photon counting capability of the PPPS-TIRF cell of FIG. 8 or 9, very large detection surfaces are feasible for numerous applications requiring high sensitivity at low cost.

Other embodiments of the present invention can be used for additional biotechnology applications. For example, instead of the TIRF methodology based on surface evanescent-wave coupling shown in FIGS. 8 and 9, a direct excitation of tagged fluorescent chromophores in the sample fluid media via an electronically modulated (e.g., shuttered, phase-locked, etc.) illumination source may be used. In another embodiment, an appropriately fast pulsed-laser is used so that the PPPS-detector with suitable discriminating, filtering and/or buffer circuitry would only be "looking at" the emitted, time-separated, fluorescence photons, and therefore not "see" the illumination source itself. Alternatively the PPPS-detector could employ an optical blocking filter directly on top of PPPS front plate 218 in FIG. 8 to prevent direct entry of the incident illumination signal and thus only be sensitive to the spectrally down-shifted fluorescence signal. A similar but slightly modified embodiment employs a narrowband transmission filter on top of PPPS front plate 218 to allow only photons having a specific wavelength of interest to be passed through the filter and be detected by the PPPS. These embodiments can be used, for example, for the analysis of foodstuffs (e.g., grains, vegetables, fruits, dairy and meat), powders, clinical specimens, environmental air samples, drinking water, irrigation water, wastewater, etc., for harmful compounds such as toxins, microbes, bacteria and viruses.

PPPS detectors in accordance with one embodiment include quantum-dot materials that function as photocathodes. For these embodiments, the detectors can be constructed without a "conventional" photocathode by coating (e.g., spin-coating) the same inside substrate surface that would normally support a conventional photocathode with an appropriate organic quantum-dot producing material and then "burning-out" the organic carrier leaving behind a "pure", photoemissive, thin-film, quantum-dot layer—i.e., a photocathode surface. In another embodiment, the PPPS detector includes such materials as quantum-dot fluorophores or scintillators in order to take advantage of their potentially very high efficiency and/or very fast response times as compared to conventional fluorophores.

Embodiments of PPPS detectors can be implemented as direct-PPPS conversion devices, or photodetectors, without use of either internal conversion layers or photocathodes by constructing a PPPS detector utilizing a special "VUV scintillator plate" as the front substrate that can emit VUV (i.e., vacuum ultraviolet) photons into a suitable plasma panel discharge gas that can be ionized upon absorption of a VUV photon, thereby causing a local cell avalanche. Possible host substrates for such a scintillator plate include LiF and $MgF_2$ which primarily have the virtue of being the two most transmissive "optical" materials for the VUV "optical" region (i.e. transmission down to ~100 nm and 120 nm respectively). However, selection of an actual VUV phosphor that might work with either of these two host crystals (e.g., LiF, $MgF_2$, etc.) will depend not only on the host crystal field strength, etc., but also on the form of incident radiation—e.g. gamma-rays versus ionizing particles. The most widely used VUV scintillator for gamma radiation is $BaF_2$ (due in part to its high-Z barium component), which although not as transparent as LiF or $MgF_2$, does transmit down to about 140 nm with significant VUV emission at slightly longer wavelengths (but still below 200 nm).

In addition to having a satisfactory VUV scintillator, embodiments of the direct-PPPS detectors must also include a suitable discharge gas capable of being ionized by photons emitted from the VUV scintillator. Some examples of relatively low ionization constant inorganic gases that can be used for such an application, as well as for the various PPPS devices disclosed above, either by themselves or in combination with other gases are: Hg (10.4 eV), $NH_3$ (10.1 eV), $NO_2$ (9.6 eV), and NO (9.3 eV). Examples of suitable low ionization constant organic gases include: ethylene $C_2H_4$ (10.5 eV), propyne (or methylacetylene) $C_3H_4$ (10.4 eV), dimethyl ether $C_2H_6O$ (10.0 eV), propene $C_3H_6$ (9.7 eV), 1,2-propadiene $C_3H_4$ (9.7 eV), methylamine $CH_6N$ (8.9 eV), dimethylamine $C_2H_7N$ (8.2 eV), trimethylamine $C_3H_9N$ (7.9 eV), etc.

Some host gases that could be used in conjunction with, or in addition to, those disclosed above, are the same types of gases that would "normally" be used for all of the previously discussed PPPS devices disclosed herein, and may include the following either by themselves or in combination: Ar, $N_2$, Xe, Kr, $CH_4$, $CF_4$, $C_2H_6$, etc. For example, two commercially available "Proportional Counting Gases" sold as P-5 and P-10 gas are respectively 95% argon/5% methane, and 90% argon/10% methane. Another common radiation detector gas mixture is 95% argon/5% nitrogen, as well as numerous combinations of the above mixtures, with and without various avalanche quenching agents such as propane, butane, etc.

Embodiments of detectors disclosed above can be used for a variety of applications involving the detection of ionizing particles. Such applications include detecting low and high energy (i.e., slow and fast) neutrons as well as other ionizing particles for which prior art micropattern detectors have typically been used. Two significant applications for embodiments of the present invention include the detection of neutrons emitted: (1) by special nuclear materials ("SNM") of serious concern regarding weapons of mass destruction (e.g., uranium and plutonium), and (2) in particle accelerators for high-energy and nuclear physics. In terms of nuclear accelerators, in addition to detecting emitted neutrons, embodiments can provide for the detection of charged particles for radioactive ion beam ("RIB") profile diagnostics. In detecting charged particles for RIB-profile diagnostics, depending upon the beam energy, etc., embodiments may not need either a photocathode or conversion layer as charged particles passing through the cell's active gas volume will create free-electrons by collisions with the gas atoms. This is particularly true in the realm of higher energy charged particles in the MeV to GeV range, in which such particles would have little difficulty in passing through the detector front substrate. In terms of detecting lower energy charged particles, the front substrate could be made extremely thin (i.e., on the order of 0.1 mm, or less) and the device materials and structure modified accordingly (e.g., using low density materials) per standard practice known to those skilled in the art to which the present invention pertains.

Figure 10:
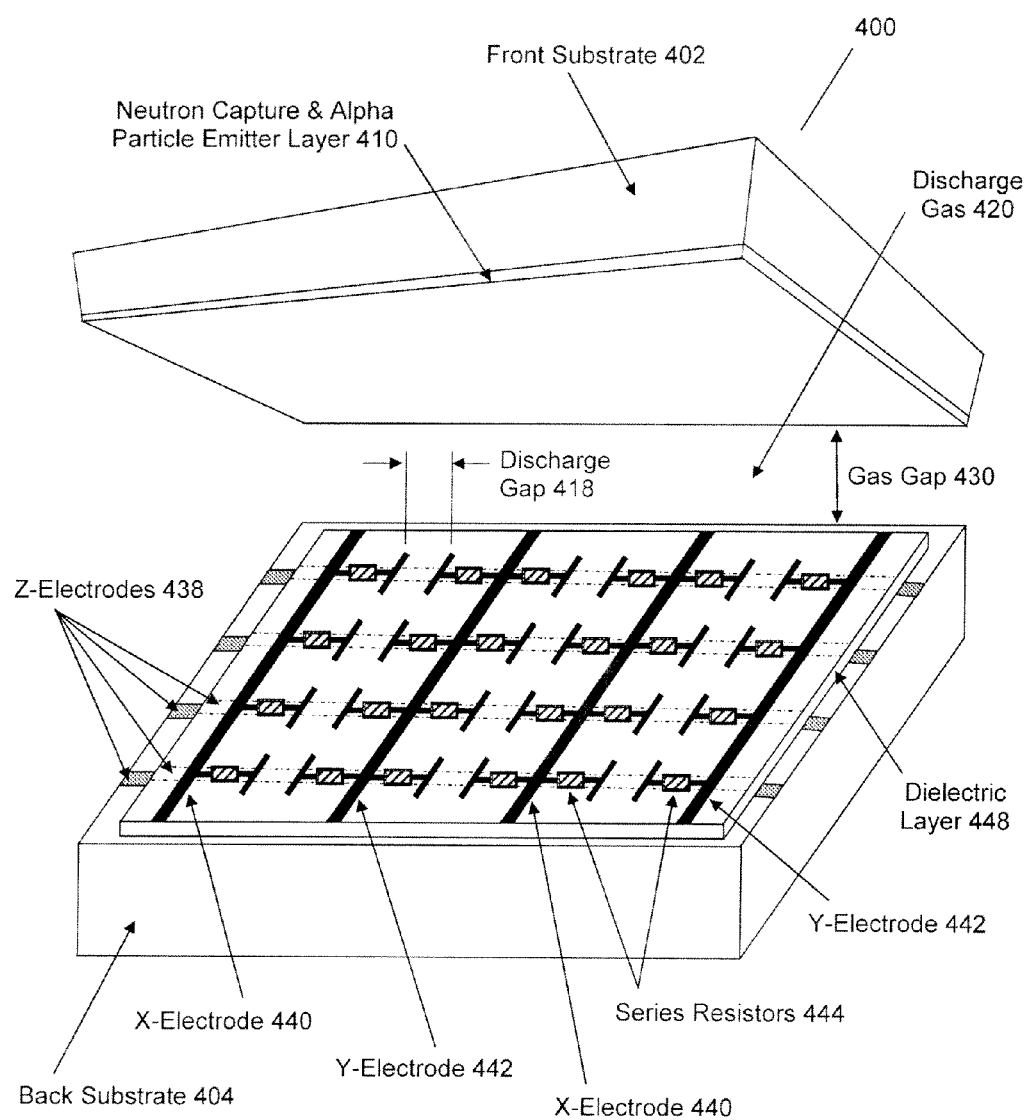
FIG. 10 is a perspective view of a surface-discharge, plasma panel sensor ("PPS") based neutron detector in accordance with one embodiment of the present invention.

Embodiments of the present invention can internally discriminate neutrons from gamma-rays, in part, due to the highly-pixelated, open-cell structure of the device as configured for neutron detection—i.e., high pixel resolution without internal cell barriers. This would be in addition to enhancements gained from reduced gamma-ray sensitivity through use of thin, low density, low-Z substrate materials, external gamma-ray filters (e.g., lead), and other "standard" software, firmware and electronic discrimination techniques known to those skilled in the art. More specifically, one embodiment utilizes a surface-discharge PPS type structure 400 modified for neutron detection as shown in FIG. 10. This structure is similar to the surface-discharge PPPS device shown in FIG. 2, but with the transparent conductor 354, photocathode layer 350, and protective dielectric layer 360 all eliminated, and replaced with a neutron capture and alpha-particle emitter layer 410 facing the discharge gas. An example of one such suitable material for layer 410 is boron. Absorption or capture of a neutron by $^{10}$B in the above PPS detector 400 would typically be followed by emission of an alpha-particle (or excited $^{7}$Li particle) which can result in a trace or string of free-electrons being created along the emitted alpha-particle's path in the gas 420. If, for example, the gas gap separation layer 430 between the disclosed PPS neutron detector front and back substrate is 0.4 mm, and the pixel pitch is 0.01 mm, then an alpha-particle moving at an average angle of 45 degrees with respect to the substrate and with an energy on the order of 2 MeV could excite a one-dimensional string of about 50 pixels to turn "ON" (i.e. discharge). On the other hand, an incident gamma-ray interacting through the mechanism of Compton scattering can also result in a series of pixel discharges, but the latter would not be produced in the linear trace pattern characteristic of an emitted alpha-particle. Thus the unique combination of an open-cell PPS pixel structure of one embodiment being able to generate a linear string of free-electrons in the gas, coupled with the fine pixel pitch of the PPS neutron detector that can resolve such a linear trace of excited free-electrons each of which can cause a localized pixel discharge event, results in a unique neutron particle discharge signature for the above PPS device. In general, such a PPS neutron detector in accordance with one embodiment could be thought of as a high resolution cloud chamber in terms of actually "seeing" the resulting alpha-particle (or excited $^{7}$Li particle) trace of excited pixels through the PPS detector, which would be significantly different from the pattern produced by isolated free-electrons resulting from Compton scattered gamma radiation.

The efficiency of embodiments of the PPS neutron detector should be good with respect to slow (i.e., thermalized) neutrons, which can be captured by the $^{10}$B containing layer 410 due to its high neutron cross-section. To capture fast neutrons, emitted for example by special nuclear materials ("SNM"), one embodiment utilizes a hydrocarbon moderator such as polyethylene in front of the PPS to thermalize the incident neutron radiation. In another embodiment the neutron detection efficiency can be improved by configuring the detection system in a vertical stack arrangement (which could also be laminated) such as that in FIG. 4, in which PPS neutron detectors 400 are substituted for the PPPS devices (i.e., PPPS-1 through PPPS-4) shown in FIG. 4. By using thin film layers of $^{10}$B, the probability of alpha-particle emission in the gas from a given film layer upon neutron capture can be made relatively high, and even if layered to be a hundred devices deep for greater neutron absorption the total detector vertical stack might still be only a few inches thick. With its large potential detection area and very high pixel spatial resolution, and vertically stacked for enhanced efficiency, such systems could be made to function somewhat similar to a "solid state" cloud chamber, but with greater capability and at much lower cost. In other embodiments, different materials can be employed for layer 410. For example, some materials that can be substituted for $^{10}$B which have good neutron capture cross-sections include $^{6}$Li and $^{157}$Gd.

A number of embodiments are specifically described herein. It will be appreciated however, that modifications and variations of these are covered by the above teachings and therefore fall within the purview of the appended claims without departing from the spirit and intended scope of the invention.

Figure 11:
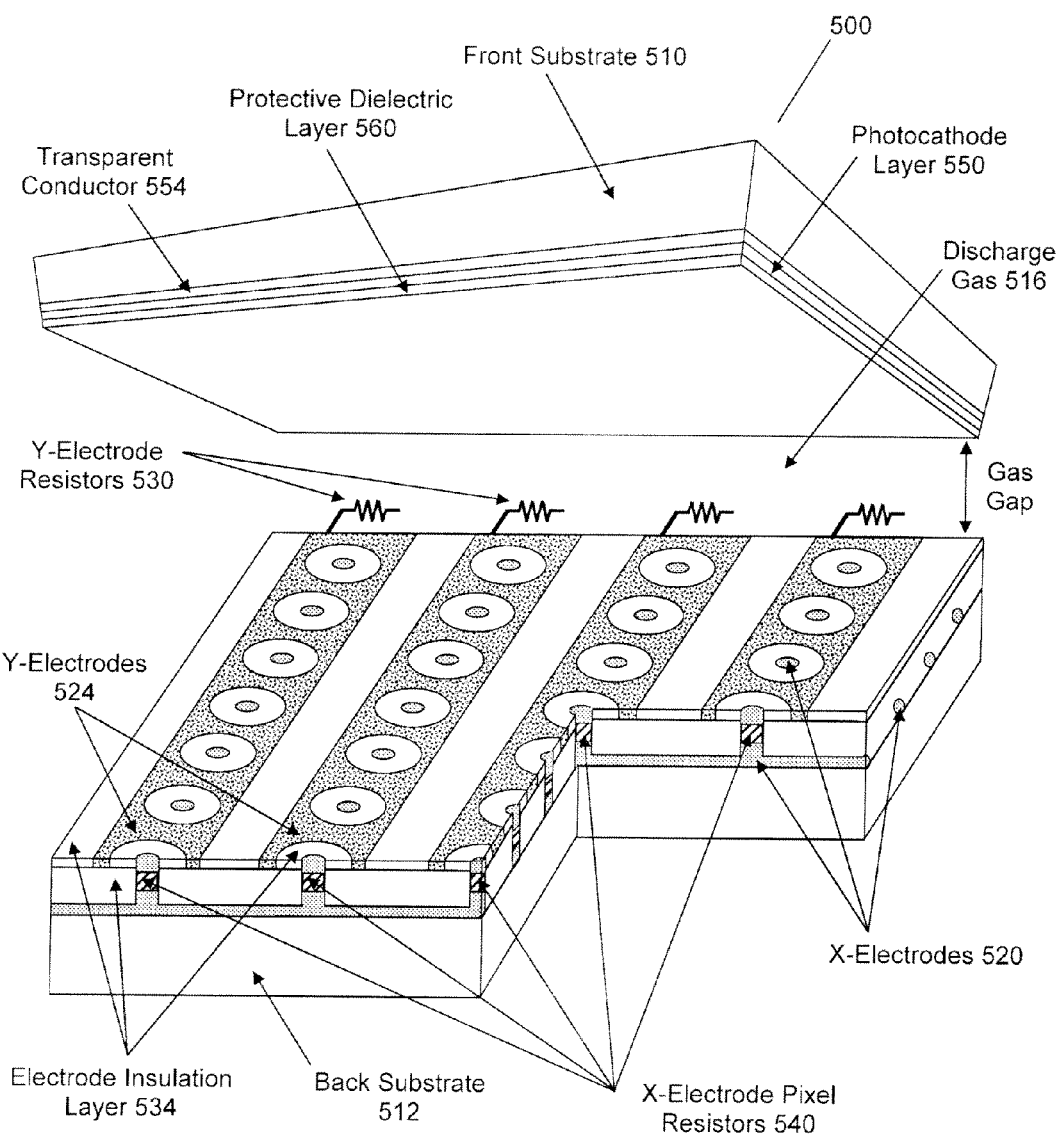
FIG. 11 is a perspective view of a surface-discharge PPPS detector with a circular electrode pattern in accordance with one embodiment of the present invention.

For example, in additional embodiments, the X- and Y-electrodes can take on a variety of different shapes from those disclosed above, but otherwise operate in similar fashion. For example, the X-Y electrode structure and X-Y pixel series resistor configuration shown for surface-discharge PPPS detector 300 of FIG. 2 can be modified to take on a significantly different pixel appearance and different impedance electronic design, yet operate in a similar manner. One such embodiment is shown in FIG. 11 for PPPS detector 500, where X and Y surface-discharge electrodes 520 and 524 consist of two concentric circles that form "a repeating bull's-eye pixel pattern". In this embodiment, each of the "interior" surface-disk electrodes (i.e., an X-electrode) has one series resistor 540 per individual pixel cell, but also just one series resistor 530 per corresponding "exterior" column line (i.e., a Y-electrode). Depending upon the application, different embodiments based on the many variations in device structure, etc. as disclosed above will each have their own set of advantages and disadvantages attributed to their respective differences in design.

What is claimed is:
1. A position-sensitive neutron counting radiation detector comprising:
 a first substrate;
 a second substrate generally parallel to said first substrate and forming a gap with said first substrate;
 a gas contained within said gap;
 a neutron conversion layer coupled to at least one of said substrates;
 at least one first electrode coupled to one of said substrates;
 at least one second electrode electrically coupled to said first electrode;
 a first impedance coupled to said first electrode;
 a power supply coupled to at least one of said electrodes;

a first discharge event detector coupled to at least one of said electrodes for detecting a gas discharge counting event in said electrode;

a plurality of pixels defined by said electrodes, each pixel capable of outputting a gas discharge counting event pulse upon interaction with ionizing particle radiation received from said neutron conversion layer, wherein each gas discharge pulse is counted as having an approximately equal value; and circuitry for detecting if a gas discharge counting event pulse is output from the pixels, and for counting each such gas discharge pulse as an individual event.

2. The radiation counting detector of claim 1, wherein an amount of neutron radiation is based on a total count of detected individual events.

3. The radiation counting detector of claim 1, further comprising a hermetic seal coupled to said first substrate and said second substrate.

4. The radiation counting detector of claim 1, wherein said power supply is a direct current power supply.

5. The radiation counting detector of claim 1, wherein said second electrode is coupled to a second impedance.

6. The radiation counting detector of claim 5, wherein said first electrode and said second electrode are respectively coupled to first and second discharge event detectors for detecting the gas discharge counting event in said electrodes.

7. The radiation counting detector of claim 6, further comprising:
time-stamp circuitry coupled to said first electrode and said second electrode that time-stamps individual radiation counting events detected by said first discharge event detector and said second discharge event detector.

8. The radiation counting detector of claim 1, further comprising an internal dielectric barrier structure for electrically isolating said pixels.

9. The radiation counting detector of claim 8, further comprising at least one current-limiting impedance coupled in series with each of said pixels.

10. The radiation counting detector of claim 8, wherein a plurality of the radiation detectors form a vertical stack.

11. The radiation counting detector of claim 1, further comprising a closed cell internal microcavity pixel structure that physically isolates said pixels.

12. The radiation counting detector of claim 1, wherein said neutron conversion layer comprises $^{10}B$.

13. The radiation counting detector of claim 1, wherein said neutron conversion layer comprises $^{6}Li$.

14. The radiation counting detector of claim 1, wherein said neutron conversion layer comprises $^{157}Gd$.

15. The radiation counting detector of claim 1, wherein said first electrode is an X-electrode and said second electrode is a Y-electrode.

16. The radiation counting detector of claim 15, wherein the location of an individual gas discharge counting event pulse is given by said X-electrode and said Y-electrode.

17. The radiation counting detector of claim 1, wherein a gas discharge between said first and second electrodes is a surface-discharge shape.

18. The radiation counting detector of claim 1, further comprising at least one current-limiting impedance coupled in series with each of said pixels.

19. The radiation counting detector of claim 1, wherein at least one third electrode is coupled to said second substrate, and said third electrode orthogonal to said first and second electrodes and physically separated by an insulating dielectric layer.

20. The radiation counting detector of claim 19, wherein said third orthogonal electrode on said second substrate is a Z-electrode.

21. The radiation counting detector of claim 1, wherein a plurality of the radiation detectors form a vertical stack.

22. A method of locating a position of individual neutrons based on detecting individual gas discharge counting events in a position-sensitive plasma panel neutron detector comprising:

receiving neutron radiation at a first substrate of a plasma panel, said plasma panel having a second substrate;

creating at least one ionizing particle within a neutron conversion layer coupled to the surface of said first substrate that faces said second substrate, said creating in response to the received radiation and resulting in an emittance of an ionizing particle out of said neutron conversion layer and into a gas contained within a gap between said first and second substrates;

causing a gas discharge pulse event at a pixel site defined by at least two electrodes of the plasma panel;

recording the position of said gas discharge pulse event by at least one discharge event detector coupled to each electrode defining the pixel site; and counting a plurality of said events, each said event counted as having approximately a same value.

* * * * *